(12) United States Patent
Zhang et al.

(10) Patent No.: US 12,016,060 B2
(45) Date of Patent: Jun. 18, 2024

(54) RELIABILITY FOR BEAM FAILURE RECOVERY AND SEARCH SPACE AND CONTROL RESOURCE SET INDEX 0

(71) Applicant: Apple Inc., Cupertino, CA (US)

(72) Inventors: Yushu Zhang, Beijing (CN); Haitong Sun, Cupertino, CA (US); Wei Zeng, Saratoga, CA (US); Dawei Zhang, Saratoga, CA (US); Hong He, San Jose, CA (US); Huaning Niu, San Jose, CA (US); Oghenekome Oteri, San Diego, CA (US); Chunhai Yao, Beijing (CN); Sigen Ye, Whitehouse Station, NJ (US); Chunxuan Ye, San Diego, CA (US); Seyed Ali Akbar Fakoorian, San Diego, CA (US)

(73) Assignee: Apple Inc., Cupertino, CA (US)

( * ) Notice: Subject to any disclaimer, the term of this patent is extended or adjusted under 35 U.S.C. 154(b) by 302 days.

(21) Appl. No.: 17/438,506

(22) PCT Filed: May 7, 2021

(86) PCT No.: PCT/CN2021/092163
§ 371 (c)(1),
(2) Date: Sep. 13, 2021

(87) PCT Pub. No.: WO2022/233037
PCT Pub. Date: Nov. 10, 2022

(65) Prior Publication Data
US 2023/0180307 A1    Jun. 8, 2023

(51) Int. Cl.
*H04W 76/10*    (2018.01)
*H04L 1/08*    (2006.01)
*H04W 72/23*    (2023.01)

(52) U.S. Cl.
CPC ............... *H04W 76/10* (2018.02); *H04L 1/08* (2013.01); *H04W 72/23* (2023.01)

(58) Field of Classification Search
CPC .......... H04W 76/10; H04W 72/23; H04L 1/08
See application file for complete search history.

(56) References Cited

U.S. PATENT DOCUMENTS

2018/0368121 A1    12/2018    Hussain et al.
2019/0037423 A1    1/2019    Yu
(Continued)

FOREIGN PATENT DOCUMENTS

| CN | 111149306 A | 5/2020 |
| EP | 3451553 | 3/2019 |
| WO | 2020166045 | 8/2020 |

OTHER PUBLICATIONS

Extended European Search Report for EP 21884128.6; 12 pages; dated Sep. 28, 2022.
(Continued)

*Primary Examiner* — Duc C Ho
(74) *Attorney, Agent, or Firm* — Kowert, Hood, Munyon, Rankin & Goetzel, P.C.

(57) ABSTRACT

This disclosure relates to techniques for performing beam failure recovery and receiving control information with improved reliability in a wireless communication system. The techniques may include the use of multiple beams in conjunction with performing beam failure recovery, for example including identifying multiple candidate beams for beam failure recovery. The techniques may also or alternatively include the use of multiple beams to provide repetitions of control information for search space and control resource set index 0.

20 Claims, 9 Drawing Sheets

(56) References Cited

U.S. PATENT DOCUMENTS

| | | |
|---|---|---|
| 2019/0306924 A1 | 10/2019 | Zhang |
| 2020/0374960 A1 | 11/2020 | Deenoo |
| 2020/0404693 A1 | 12/2020 | Zhou |
| 2021/0006456 A1 | 1/2021 | Kim |
| 2021/0007066 A1* | 1/2021 | Lin ..................... H04W 76/11 |
| 2022/0361202 A1* | 11/2022 | Yi ...................... H04W 24/10 |

OTHER PUBLICATIONS

Huawei et al. "Enhancements on multi-TRP for reliability and robustness in Rel-17"; 3GPP TSG RAN WG1 Meeting #104bis-e R1-2102334; 15 pages; Apr. 12, 2021.
International Search Report and Written Opinion for PCT/CN2021/092163; 9 pages; dated Jan. 30, 2022.
Nokia et al. "Beam Recovery;" 3GPP TSG RAN WG1 #89 R1-1708905; Hangzhou, P.R. China; 7 pages; May 19, 2017.
Qualcomm Inc. "Enhancements on Multi-beam Operation;" 3GPP TSG-RAN WG1 Meeting #97 R1-1907290; May 17, 2019.
Vivo "Remaining issues on mechanism to recover from beam failure;" 3GPP TSG RAN WG1 Meeting #92bis R1-1803818; Sanya, China; 6 pages; Apr. 20, 2018.
Extended European Search Report for EP Patent Application No. 23205492.4; Mar. 1, 2024.

\* cited by examiner

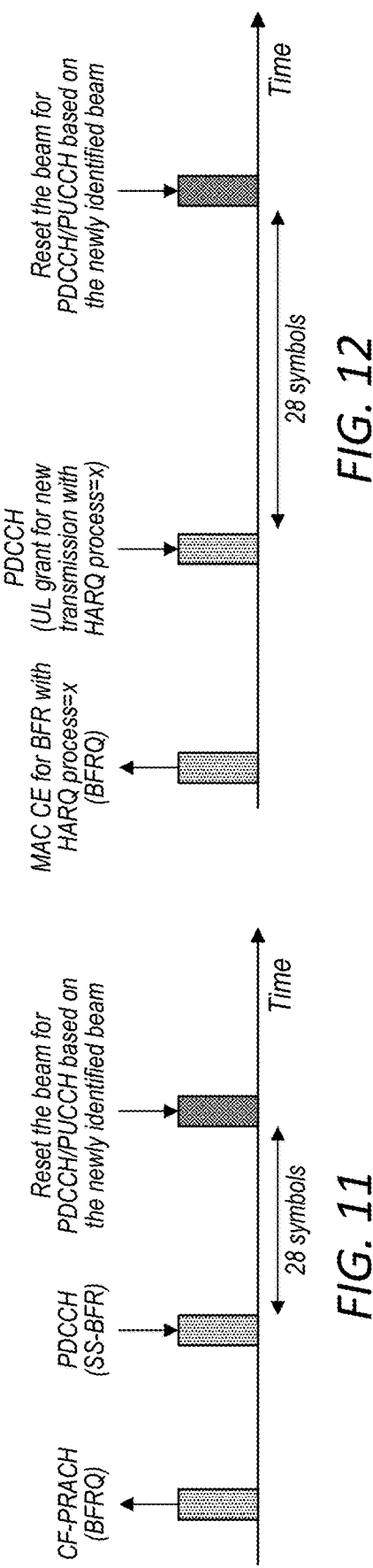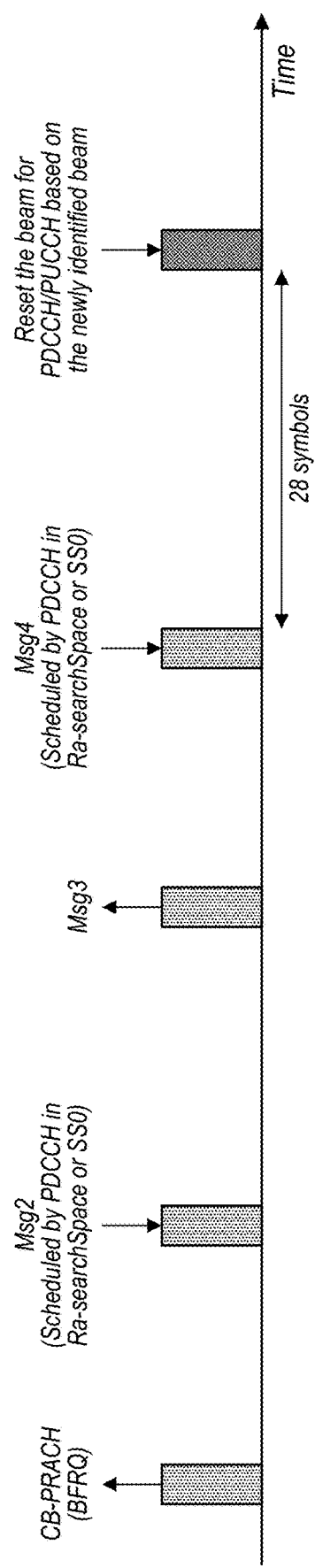
FIG. 11
FIG. 12
FIG. 13

RELIABILITY FOR BEAM FAILURE RECOVERY AND SEARCH SPACE AND CONTROL RESOURCE SET INDEX 0

FIELD

The present application relates to wireless communications, and more particularly to systems, apparatuses, and methods for performing beam failure recovery and receiving control information with improved reliability in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for performing beam failure recovery and receiving control information with improved reliability in a wireless communication system.

According to the techniques described herein, it may be possible for a cellular base station to provide multiple physical downlink control channel repetitions with different beam configurations to a wireless device using a search space and control resource set index 0 configuration. These techniques include aspects directed to both single frequency network and non-single frequency network configurations.

Additionally, techniques are described herein for identifying multiple candidate beams when performing beam failure recovery. According to such techniques, it may be possible for a wireless device to transmit a beam failure recovery request using multiple candidate beams identified by the wireless device for the beam failure recovery, for example using multiple physical random access channel resources associated with the identified candidate beams, or by indicating multiple transmission configuration indicator indexes in a media access control element based beam failure recovery request. Additionally, or alternatively, it may be possible for a cellular base station to transmit a beam failure recovery response using multiple candidate beams for beam failure recovery. The beams used by the cellular base station may be the same beams identified and used to transmit the beam failure recovery request, e.g., if multiple such beams are identified, or may include the beam identified and used to transmit the beam failure recovery request as well as a beam configured by the cellular base station, e.g., if only one beam is identified by the wireless device in the beam failure recovery request.

The techniques described herein may thus make use of wireless device capabilities to transmit and/or receive using multiple beams to potentially increase the reliability and robustness of control information communications and beam failure recovery operations, at least according to some embodiments.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 11-13 illustrate exemplary aspects of various possible approaches to performing beam failure recovery including identifying one new beam in a wireless communication system, according to some embodiments.

Figure 1:
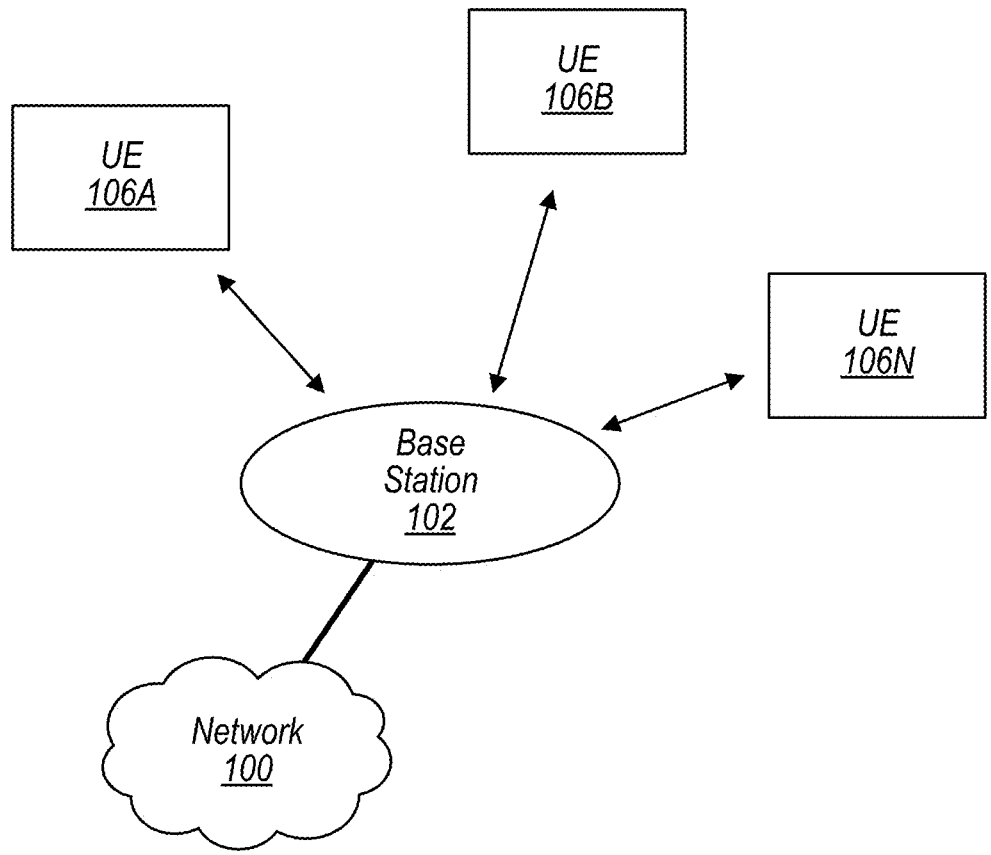
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
QCL: Quasi-Co-Located or Quasi-Co-Location
CSI: Channel State Information
CSI-RS: Channel State Information Reference Signals
CSI-IM: Channel State Information Interference Management
CMR: Channel Measurement Resource
IMR: Interference Measurement Resource
ZP: Zero Power
NZP: Non Zero Power
CQI: Channel Quality Indicator
PMI: Precoding Matrix Indicator
RI: Rank Indicator Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
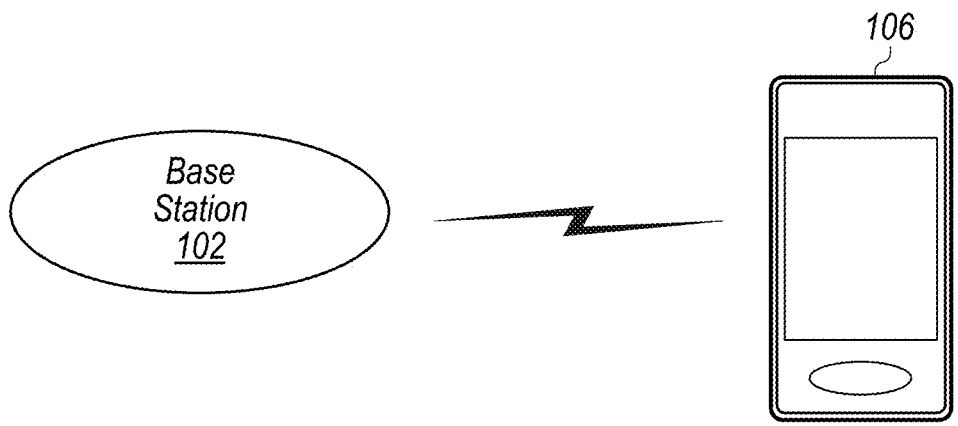
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for performing beam failure recovery and receiving control information with improved reliability in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
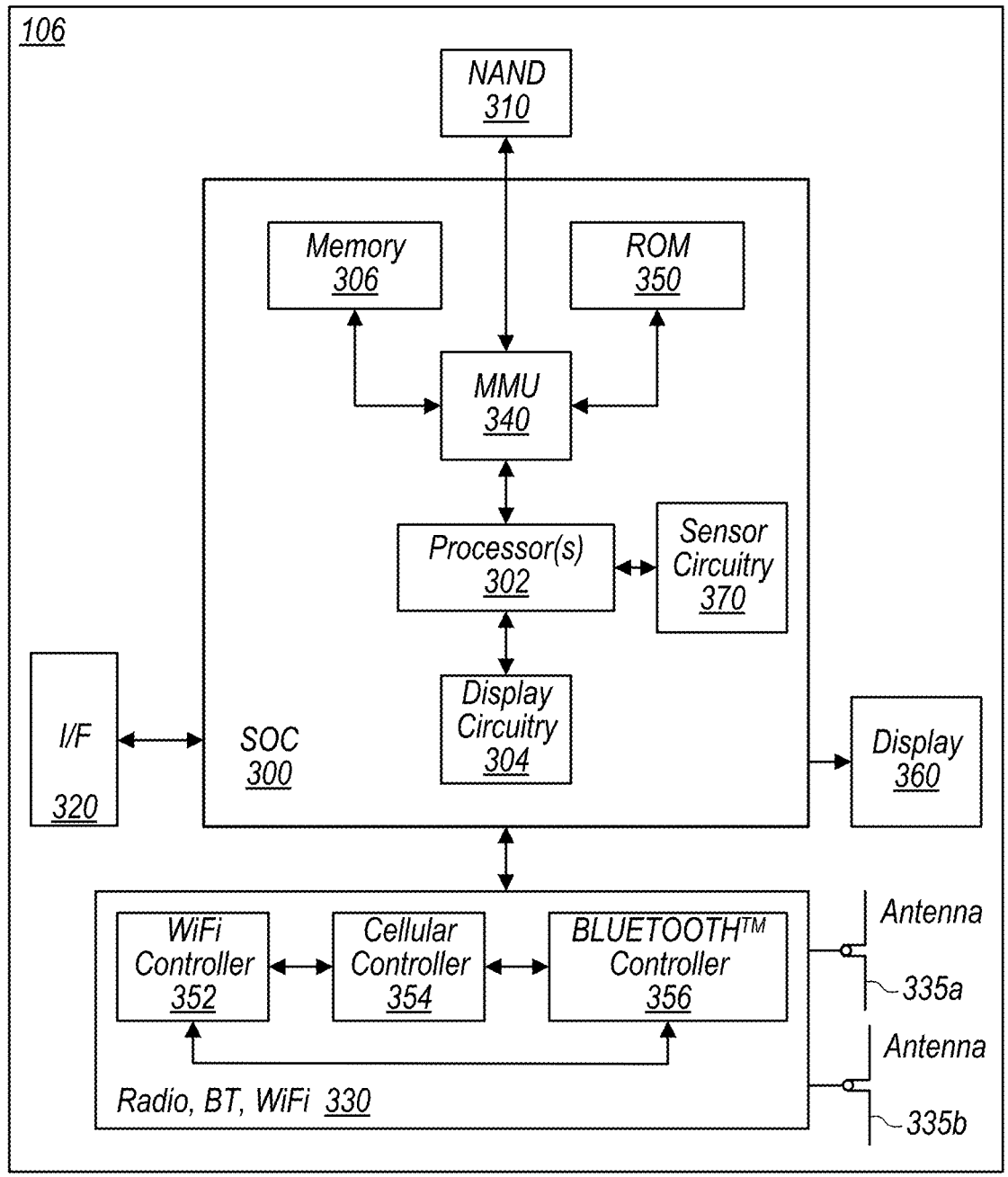
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform beam failure recovery and/or receive control information with improved reliability in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform beam failure recovery and/or receive control information with improved reliability in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
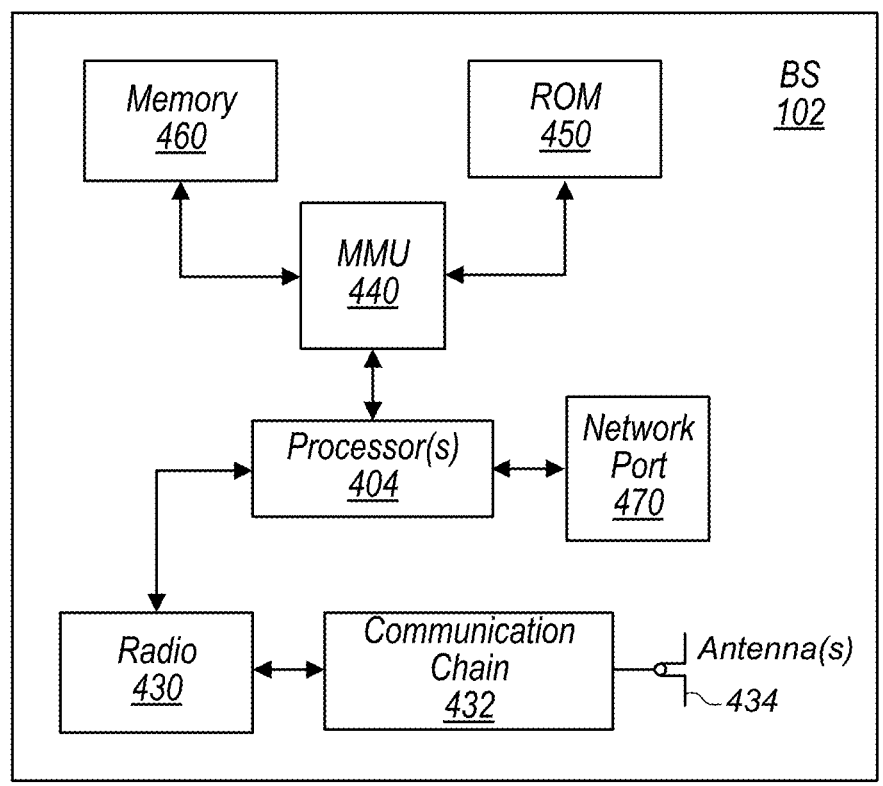
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Reference Signals

A wireless device, such as a user equipment, may be configured to perform a variety of tasks that include the use of reference signals (RS) provided by one or more cellular base stations. For example, initial access and beam measurement by a wireless device may be performed based at least in part on synchronization signal blocks (SSBs) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3GPP NR cellular communication standard, the channel state information fed back from the UE based on CSI-RS for CSI acquisition may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer indicator (Li), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MEMO precoding matrix in the codebook may have a unique index. Accordingly, as part of the channel state information fed back by the LIE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
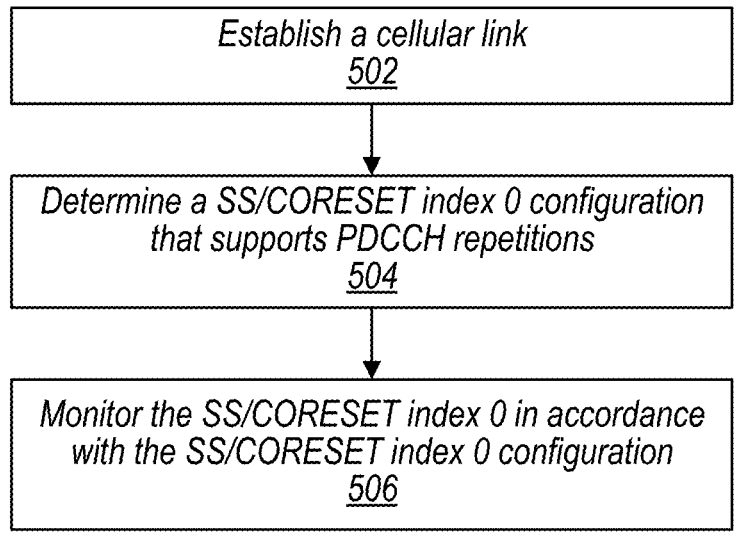
FIG. 5 is a flowchart diagram illustrating aspects of an exemplary possible method for receiving control information with improved reliability in a wireless communication system, according to some embodiments.

FIG. 5—Beam Failure Recovery and Control Information Provision with Improved Reliability As wireless device capabilities increase, it may be useful to provide techniques that can make use of those increased wireless device capabilities, for example to improve the reliability of wireless communications, to reduce the latency of wireless communications, to increase the amount of data that can be communicated, and/or for any of various other possible reasons.

One wireless device capability that may be beneficial to make use of when performing wireless communications may include the ability to use multiple beams for transmitting and/or receiving, either concurrently/simultaneously or at different times, for example to increase the amount of data that can be transmitted and/or to improve the reliability of wireless communications by providing repetitions of communicated data or signaling with beam diversity.

Among possible areas in which such use of multiple beams could be introduced to potentially improve communication reliability and/or provide other possible benefits, beam failure recovery and provision of control information may be included, at least according to some embodiments.

Thus, it may be beneficial to specify techniques for performing beam failure recovery and receiving control information with improved reliability by utilizing multiple beams, at least in some instances. To illustrate such possible techniques, FIGS. 5-6 are flowchart diagrams illustrating methods for receiving control information with improved reliability, and for performing beam failure recovery with improved reliability in a wireless communication system, respectively, at least according to some embodiments.

Figure 6:
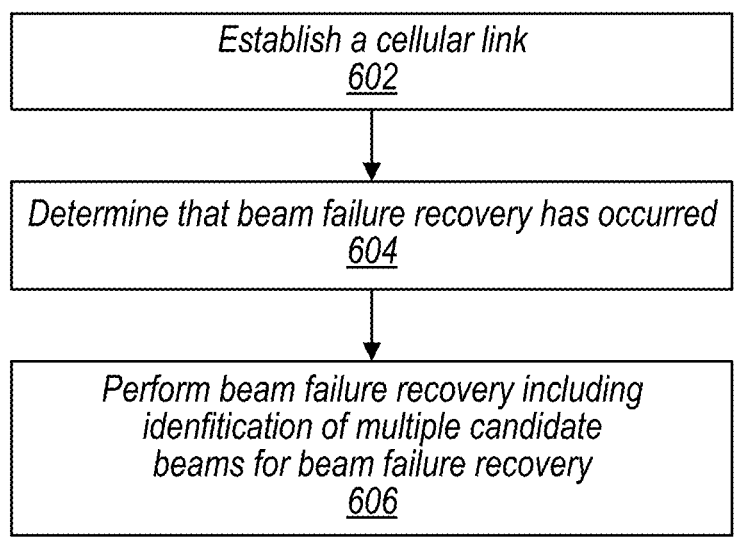
FIG. 6 is a flowchart diagram illustrating aspects of an exemplary possible method for performing beam failure recovery with improved reliability in a wireless communication system, according to some embodiments.

Aspects of the methods of FIGS. 5-6 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the methods of FIGS. 5-6 are described in a manner relating to the use of communication techniques and/or features associated with 3GPP and/or NR specification documents, such description is not intended to be limiting to the disclosure, and aspects of the methods of FIGS. 5-6 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/ or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

Additionally, it should be noted that in various instances, the wireless link may operate according to a single frequency network (SFN) scheme or a non-SFN scheme.

In 504, the wireless device may determine a SS/CORESET index 0 configuration that supports PDCCH repetitions, e.g., using multiple beam configurations. The SS/CORESET index 0 configuration may include any of various possible configuration aspects. As one possibility, if the wireless link operates according to a SFN scheme, according to the SS and CORESET index 0 configuration, multiple TCI states are quasi-co-located (QCLed) with a synchronization signal block (SSB), and multiple repetitions of a SS and CORESET index 0 instance associated with the SSB are provided using the multiple TCI states QCLed with the SSB.

Note that in such a scenario, the same SS/CORESET index 0 instance should be applied for both TCIs. If there are two reference signals in a TCI state, that are used to provide different QCL types (e.g., QCL-TypeA and QCL-TypeD), it may be the case that the two reference signals are QCLed with the same SSB. Alternatively, the reference signal to provide a particular QCL type (e.g., QCL-TypeD, as one possibility) may be used to determine the SSB associated with the TCI state.

In some instances, the wireless device may determine multiple SS and CORESET index 0 TCI states configured for PDCCH repetitions for the wireless device, where according to the SS and CORESET index 0 configuration, each of the SS and CORESET index 0 TCI states is QCLed with a SSB, for example such that the SS and CORESET index 0 instances associated with those SSBs may be configured to carry PDCCH repetitions.

In some instances, it may be the case that the SS and CORESET index 0 configuration in a SFN scheme supports PDCCH repetitions for one or more types of SSs (for example, UE specific search space, as one possibility), but does not support PDCCH repetitions for one or more other types of SSs (for example, type0 common search space, as one possibility). In some instances, it may not be allowed (e.g., in cellular communication standard specifications) to conFIG. 2 TCI states for a SS and CORESET index 0 configuration for a wireless link that operates according to a SFN scheme.

As a further possibility, it may be possible that the SS and CORESET index 0 configuration includes association of a SS and CORESET instance with an index other than 0 with a SS and CORESET index 0 instance, for example where the SS and CORESET instance with the index other than 0 and the associated SS and CORESET index 0 instance have different TCI states. In accordance with the SFN scheme of the wireless link, although they may have different TCI states, it may be the case that the SS and CORESET instance with the index other than 0 and the associated SS and CORESET index 0 instance are fully overlapping in time and frequency resources.

It may also be possible that the wireless link operates according to a non-SFN scheme. In such a scenario, as one possibility, according to the SS and CORESET index 0 configuration, multiple TCI states may be configured for SS and CORESET index 0 for the wireless link, where different TCI states are QCLed with different SSBs.

As another possibility in accordance with a non-SFN scheme, according to the SS and CORESET index 0 configuration, a SS and CORESET instance with an index other than 0 may be associated with a SS and CORESET index 0 instance. In such a scenario, the SS and CORESET index 0 configuration may support provision of PDCCH repetitions using the SS and CORESET instance with the index other than 0 and the associated SS and CORESET index 0 instance.

In some instances, it may be the case that the SS and CORESET index 0 configuration in a non-SFN scheme supports PDCCH repetitions for one or more types of SSs (for example, UE specific search space, as one possibility), but does not support PDCCH repetitions for one or more other types of SSs (for example, type0 common search space, as one possibility). In some instances, it may not be allowed (e.g., in cellular communication standard specifications) to configure 2 TCI states for a SS and CORESET index 0 configuration for a wireless link that operates according to a non-SFN scheme.

In 506, the wireless device may monitor the SS/CORESET index 0 in accordance with the SS/CORESET index 0 configuration. This may include receiving multiple PDCCH repetitions using multiple beams, at least in some instances.

For example, in a scenario in which multiple TCI states are QCLed with a SSB for the wireless link in a SFN scheme, and multiple repetitions of a SS and CORESET index 0 instance associated with the SSB are provided using the multiple TCI states QCLed with the SSB, the wireless device may determine to monitor the multiple repetitions of the SS and CORESET index 0 instance using the configured TCI states associated with the SS and CORESET index 0 instance.

As another example, in a scenario in which a SS and CORESET instance with an index other than 0 is associated with a SS and CORESET index 0 instance for the wireless link in a SFN scheme, where the associated SS and CORESET instances have different TCI states, the wireless device may determine to monitor both the SS and CORESET index 0 instance and the associated SS and CORESET instance with the index other than 0.

As yet another example, in a scenario in which multiple TCI states are configured for SS and CORESET index 0 for the wireless link in a non-SFN scheme, where different TCI states are QCLed with different SSBs, the wireless device may determine to monitor multiple SS and CORESET index 0 instances. The multiple SS and CORESET index 0 instances monitored may be determined based at least in part on the SSBs with which the TCI states configured for the SS and CORESET index 0 for the wireless device are QCLed.

As a further example, in a scenario in which a SS and CORESET instance with an index other than 0 is associated with a SS and CORESET index 0 instance in a non-SFN scheme, the wireless device may determine to monitor both the SS and CORESET index 0 instance and the associated SS and CORESET instance with the index other than 0. Note that the wireless device may assume the PDCCH instances received in such associated SS and CORESET instances are repetitions provided they are received within a configured time window (e.g., within a slot, as one possibility), according to some embodiments. There may also be several possibilities for handling scenarios in which the associated SS and CORESET instances are not within the configured time window. As one such possibility, the wireless device may assume that PDCCH repetitions are instead included in the SS and CORESET instance with the index other than 0 and the closest SS and CORESET index 0 index within the time window. As another possibility, in such a scenario, the wireless device may not be expected to monitor the SS and CORESET instance with the index other than 0 or the associated SS and CORESET index 0 instance within the time window. As a further possibility, in such a scenario, the wireless device may still be expected to monitor the associated SS and CORESET instances, but may not assume that the associated SS and CORESET instances include PDCCH repetitions. As a still further possibility, such a scenario may be considered an error case, possibly with corresponding wireless device behavior expectations left undefined in cellular communication standard specifications.

Alternatively, in some instances, the wireless device may determine to monitor one PDCCH repetition of the multiple configured PDCCH repetitions using one beam of the multiple beams configured for the PDCCH repetitions in accordance with the SS/CORESET index 0 configuration. For example, in a scenario in which multiple SS and CORESET index 0 TCI states are configured for PDCCH repetitions for the wireless device, where according to the SS and CORESET index 0 configuration, each of the SS and CORESET index 0 TCI states is QCLed with a SSB such that the SS and CORESET index 0 instances associated with those SSBs are configured to carry PDCCH repetitions, the wireless device may determine a SS and CORESET index 0 instance to monitor based at least in part on a TCI state associated with the SS and CORESET index 0 instance. The monitored occasion may be the SS and CORESET index 0 instance associated with the SSB QCLed with the downlink reference signal in a determined one of the TCI states configured for PDCCH repetitions for the wireless device, where the selected TCI state can be determined in any of various ways. For example, control signaling such as RRC or MAC CE control signaling may be used to indicate the TCI state to select, or the manner in which to select the TCI state (e.g., selection of the TCI state with the lowest or highest ID, selection of the TCI state configured to provide certain QCL information (such as QCL-TypeA, as one possibility), etc.) may be specified in cellular communication standard specifications, among various possibilities.

Note that when multiple PDCCH repetitions are supported in conjunction with a SS/CORESET index 0 configuration, those PDCCH repetitions may be provided from one cellular base station or from multiple cellular base stations. For example, in a SFN or non-SFN scheme, it may be possible that different TCI states configured for possible PDCCH repetitions in a SS/CORESET index 0 configuration are associated with different TRPs, which may be provided by different cellular base stations, or that such different TCI states are provided by a single cellular base station, according to various embodiments.

Thus, at least according to some embodiments, the method of FIG. 5 may be used by one or more cellular base stations and a wireless device to transmit and receive multiple PDCCH repetitions in accordance with a SS/CORESET index 0 configuration, which may increase the robustness of the PDCCH reception by the wireless device, which may in turn improve the reliability of wireless communications between the wireless device and the cellular network, at least in some instances.

As shown, the method of FIG. 6 may operate as follows.

In 602, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities. For example, in some instances, the wireless device may provide wireless device capability information indicating whether the wireless device supports beam failure recovery request transmission using multiple contention free (CF) physical random access channel (PRACH) resources and/or using multiple contention based (CB) PRACH resources. In some instances, the wireless device capability information may additionally or alternatively indicate whether the wireless device supports reporting more than one candidate beam for beam failure recovery when providing a beam failure recovery request using MAC CE signaling.

In 604, the wireless device may determine that beam failure has occurred for the wireless link. Determining that the beam failure has occurred may be based on one or more (filtered or instantaneous) cell measurements for a beam associated with the wireless link (e.g., if the measurement results are below a certain threshold), a error rate for a beam associated with the wireless link (e.g., if the error rate exceeds a certain threshold), and/or based on any of various other possible considerations.

In some instances, the wireless device may determine one or more candidate beams for beam failure recovery based at least in part on determining that beam failure has occurred. For example, certain resources may be provided to the wireless device by the cellular base station for candidate beam detection (CBD), and the wireless device may perform cell measurements using those provided resources. If at least one beam associated with such a provided resource meets configured requirements to be identified as a candidate beam for beam failure recovery, the wireless device may determine that the beam is a candidate beam for beam failure recovery. In some instances, multiple candidate beams for beam failure recovery may be determined. For example, if multiple beams associated with CBD resources meet configured requirements to be identified as candidate beams for beam failure recovery, those multiple beams may be determined to be candidate beams for beam failure recovery. Note that if desired, different requirements (e.g., cell strength and/or quality using the beam) may be configured for selection of a first candidate beam for beam failure recovery and for any additional candidate beams for beam failure recovery.

In 606, the wireless device may perform beam failure recovery, including identifying multiple beams as candidate beams for the beam failure recovery. Note that the beam failure recovery may be performed in any of various ways. As one possibility, the beam failure recovery may be performed using a contention free (CF) random access channel (RACH) procedure or a contention based (CB) RACH procedure, for example for beam failure recovery on a primary cell (e.g., either for a primary cell group (PCell) or a secondary cell group (PSCell)). As another possibility, the beam failure recovery may be performed using MAC CE signaling, for example for beam failure recovery on a secondary cell (SCell). The beam failure recovery may include at least provision of a beam failure recovery request from the wireless device to the cellular base station, and provision of a beam failure recovery response from the cellular base station to the wireless device, e.g., in response to the beam failure recovery request. Depending on the type of beam failure recovery, further communications may also be included in the beam failure recovery.

According to some embodiments, for CF RACH procedure based beam failure recovery, the wireless device may transmit the beam failure recovery request using multiple CF physical RACH (PRACH) resources. For example, if the wireless device is able to determine multiple candidate beams for the beam failure recovery, a different beam may be used to transmit on each CF PRACH resource of the multiple CF PRACH resources. Use of those beams to transmit on the associated CF PRACH resources by the wireless device may identify them to the cellular base station as candidate beams for beam failure recovery.

As another possibility, for CB RACH procedure based beam failure recovery, the wireless device may transmit the beam failure recovery request using multiple CB PRACH resources. For example, if the wireless device is able to determine multiple candidate beams for the beam failure recovery, a different beam may be used to transmit on each CB PRACH resource of the multiple CB PRACH resources. Use of those beams to transmit on the associated CB PRACH resources by the wireless device may identify them to the cellular base station as candidate beams for beam failure recovery.

In the case of CB RACH procedure based beam failure recovery, the beam failure recovery response may include a random access response (RAR) message. In such a scenario, the RAR may indicate a number of physical uplink shared channel (PUSCH) repetitions to use to transmit the message 3 of the CB RACH procedure. The wireless device may transmit the message 3 using the indicated number of repetitions. If multiple repetitions are indicated, the beams used to transmit the beam failure recovery request on the multiple CB PRACH resources may also used to transmit the message 3 of the CB RACH procedure. The beam and repetition mapping can be predefined or may be configured by the RAR, among various possibilities. If one instance is indicated, the wireless device may select a beam to use to transmit the message 3 of the CB RACH procedure from the beams used to transmit the beam failure recovery request. The beam selection may be based on the lowest or highest PRACH resource index, the lowest or highest SSB/CSI-RS resource index associated with the PRACH resources, the first or last PRACH occasion, an indication provided in the RAR, and/or any of various other possible considerations.

In the case of MAC CE based beam failure recovery, the wireless device may provide a beam failure recovery request that identifies multiple candidate beams for beam failure recovery to the cellular base station via MAC CE signaling. For example, the wireless device may report the number of identified candidate beams as well as the beam index for each identified candidate beam using MAC CE signaling, according to some embodiments.

According to some embodiments, whether or not the wireless device identifies multiple candidate beams for beam failure recovery in the beam failure recovery request, it may be possible that the cellular base station provides a beam failure recovery response using multiple beams.

If the beam failure recovery request identifies multiple candidate beams for beam failure recovery, it may be the case that the multiple beams used to provide the beam failure recovery response are based on the multiple beams used to transmit the beam failure recovery request. For example, the same beams used to provide PRACH resources of the beam failure recovery request (or beams QCLed with them) may be used to provide the beam failure recovery response.

If the beam failure recovery request identifies only one candidate beam for beam failure recovery, it may be the case that the multiple beams used to provide the beam failure recovery response include the beam used to transmit the beam failure recovery request, as well as one or more additional beams configured by the cellular base station and/or determined in accordance with cellular communication standard specifications. The additional beam(s) could be indicated by RRC signaling or MAC CE signaling, or could be selected based on an active TCI state for the wireless device (e.g., the TCI state for PDSCH reception, as one possibility), among various possibilities. Where the beams are mapped (e.g., to SS/CORESET instances in accordances with a SFN based or non-SFN based scheme for PDCCH repetition) may be configured by higher layer (e.g., RRC or MAC CE) signaling. Note that for a non-SFN scheme, the beams may be mapped to different instances of SS-BFR or different resource elements for the PDCCH. Alternatively, it may be the case that such an approach may be used only in conjunction with a SFN based scheme for PDCCH repetition.

Note that a beam failure recovery response transmitted using multiple beams may be provided via a PDCCH carried in a search space for beam failure recovery (SS-BFR) associated with a CORESET that supports use of multiple beams, or may be provided via PDCCH transmissions carried in multiple SSs (which could include a SS-BFR and another SS) and CORESET combinations, among various possibilities.

The wireless device and the cellular base station may be configured to wait a certain amount of time after the beam failure recovery response is received to communicate using the beam(s) identified as candidate beams for the beam failure recovery, at least in some embodiments. In a scenario in which multiple SSs are used for provision of the beam failure recovery response, it may be helpful to provide a mechanism for determining from which SS to apply the specified or configured amount of time before communicating using the identified beam(s), e.g., to maintain synchronization between the wireless device and the cellular base station. Such a mechanism could include determining the first or last SS/PDCCH candidate, or the SS with the lowest or highest SS-ID or CORESET ID, and determining to apply the specified or configured amount of time from the determined SS/PDCCH candidate, as one possibility. Other approaches are also possible.

After the configured or specified amount of time, the wireless device and the cellular base station may communicate using one or more beams identified as candidate beams for the beam failure recovery, for example for PDCCH/PUCCH communications. If may be the case that one of the identified beams is used, or it may be possible that multiple beams identified as candidate beams for the beam failure recovery are used.

If one of the identified beams is used, the wireless device and/or the cellular base station may select the beam to use based on any of various possible considerations. As one possibility, the beam may be selected based on having the lowest or highest PRACH resource index, or the lowest or highest SSB/CSI-RS resource index associated with the PRACH resources, or the first or last PRACH occasion. As another possibility, the beam may be selected (e.g., based on similar and/or different considerations) and indicated to the wireless device by the cellular base station, for example in the beam failure recovery response.

If multiple identified beams are used, as one possibility, the wireless device may apply all of the identified beams for PDCCH reception, e.g., in a SFN scheme. In a non-SFN scheme, the wireless device may apply different beams to different CORESETs. The mapping between beams and CORESETS can be determined based on CORESET index or CORESET pool index and beam index (e.g., SSB/CSI-RS index), among various possibilities. Alternatively, the mapping between beams and CORESETs may be configured by higher layer signaling (e.g., RRC or MAC CE) or via downlink control information (DCI).

For PUCCH, the wireless device may apply different beams to different PUCCH resources or PUCCH resource groups. The mapping between beams and PUCCH resources can be determined based on PUCCH resource index or PUCCH resource group index and beam index (e.g., SSB/CSI-RS index), among various possibilities. Alternatively, the mapping between beams and PUCCH resources may be configured by higher layer signaling (e.g., RRC or MAC CE) or via DCI.

Thus, at least according to some embodiments, the method of FIG. 6 may be used to perform beam failure recovery in a manner that is able to identify and possibly utilize multiple beams for increased robustness, at least in some instances.

FIGS. 7-19 and Additional Information

FIGS. 7-19 illustrate further aspects that might be used in conjunction with the methods of FIGS. 5-6 if desired. It should be noted, however, that the exemplary details illustrated in and described with respect to FIGS. 7-19 are not intended to be limiting to the disclosure as a whole: numerous variations and alternatives to the details provided herein below are possible and should be considered within the scope of the disclosure.

In 3GPP Releases 15 and 16, a physical downlink control channel (PDCCH) can be carried in a search space (SS) associated with a control resource set (CORESET), for example as described further in 3GPP TS 38.213 section 10.1. The SS can be used to determine the time domain resource(s) and the CORESET can be used to determine the frequency domain resource(s) and spatial filter (e.g., transmission configuration indicator (TCI)) on which the PDCCH may be carried.

A special SS/CORESET for which each instance is associated with a synchronization signal block (SSB) instance may be defined and referred to as SS/CORESET #0, at least in some instances. In such a case, the PDCCH beam and time/frequency location for the SS/CORESET may be determined based on the associated SSB. It may be the case that a UE does not need to monitor all instances for the SS/CORESET 0; instead, the UE may only need to monitor the SS/CORESET 0 instance associated with one SSB from the most recent of a SSB associated with a random access channel (RACH) procedure or a SSB quasi-co-located (QCL) with the CSI-RS in the TCI state for the CORESET 0, at least according to some embodiments.

Figure 7:
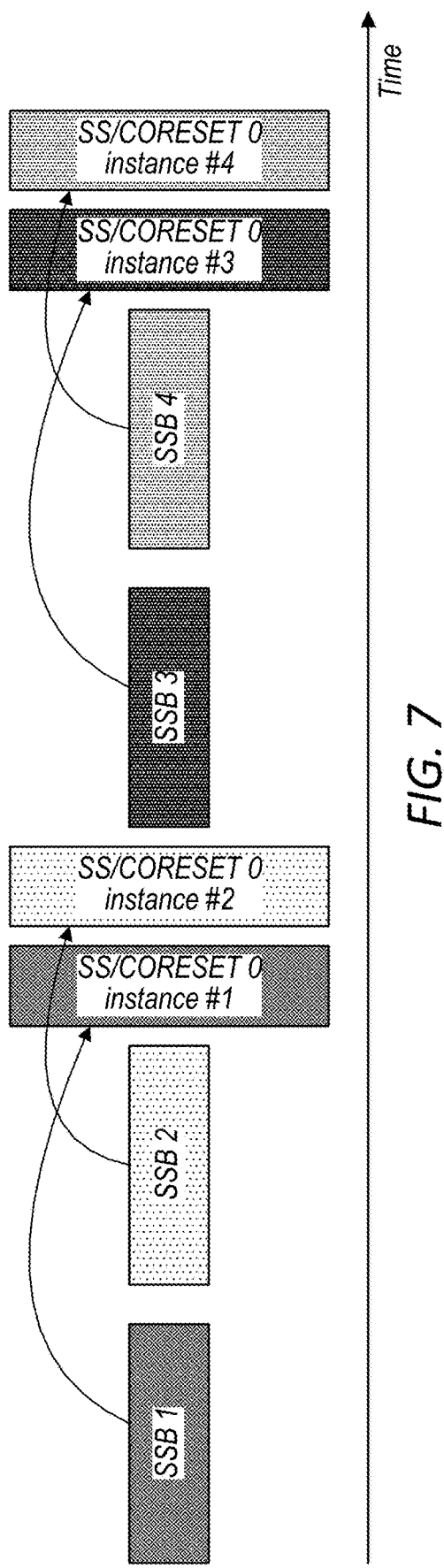
FIGS. 7-10 illustrate exemplary aspects of various possible approaches to providing search space and control resource set index 0 instances in a wireless communication system, according to some embodiments.

FIG. 7 illustrates exemplary aspects of such an arrangement, according to some embodiments. As shown, for each of several SSB instances (e.g., which each may be transmitted using a different beam configuration, as indicated by different shading patterns), a SS/CORESET 0 instance may also be transmitted by a cell (e.g., using the same beam configuration as the associated SSB instance). The SS/CORESET 0 configuration information may be provided in system information provided by the cell, for example in a master information block (MIB).

In 3GPP Release 17, it may be possible to introduce PDCCH reliability enhancements. As one such possible scheme for providing PDCCH transmissions with increased reliability, in a single frequency network (SFN) configuration, it may be possible for one CORESET to be configured with two TCI states. Thus, it may be possible for PDCCH repetitions to be transmitted (e.g., from different TRPs) in fully overlapped resource elements with different beam configurations.

As another possible scheme for providing PDCCH transmissions with increased reliability, in a non SFN configuration, 2 SSs/CORESETs can be used to carry PDCCH repetitions. In such a scenario, each PDCCH repetition may be carried by a SS/CORESET. Different beams can be applied to the different SS/CORESETs. The PDCCH repetitions may be multiplexed using time division multiplexing (TDM) and/or frequency division multiplexing (FDM).

Thus, it may be useful to provide techniques for applying such PDCCH reliability enhancements to SS/CORESET 0 transmissions, for example including how to configure 2 TCI states for SS/CORESET 0 in a SFN scheme.

Figure 8:
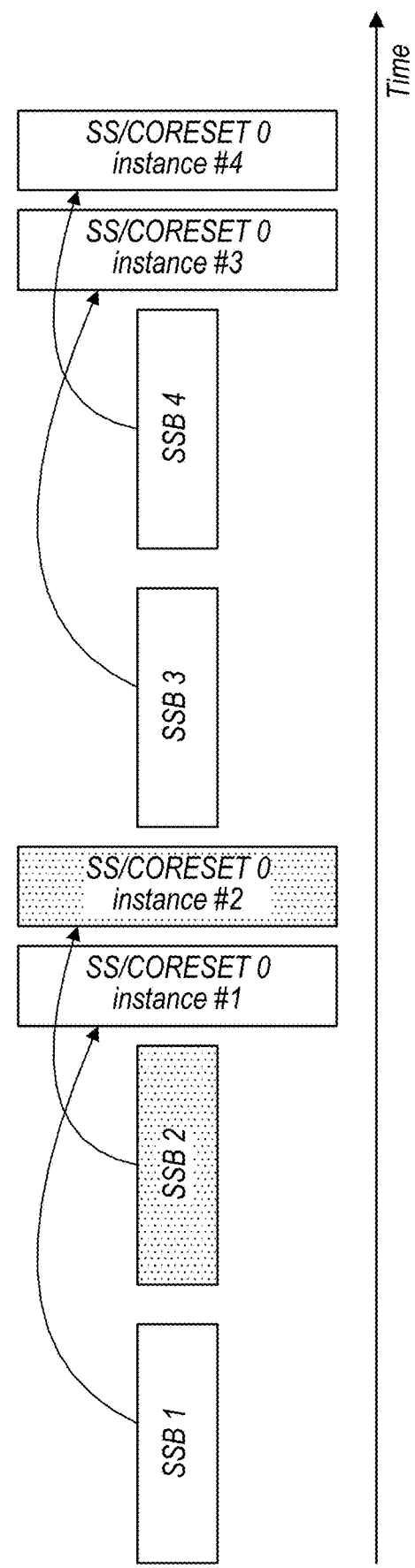

As one such option, the reference signal in the two TCI states for CORESET 0 may be QCLed with the same SSB. If there are two reference signals in a TCI state, which are used to provide different QCL-Types (e.g., QCL-TypeA and QCL-TypeD), it may be the case that the two reference signals are QCLed with the same SSB. As another possibility, in such a scenario, the reference signal to provide a particular QCL type (e.g., QCL-TypeD, or another QCL-Type, as desired) may be used for associated SSB selection. FIG. 8 illustrates exemplary aspects of such an approach, according to some embodiments. As shown, similar to FIG. 7, SS/CORESET 0 instances associated with each of several SSB instances may be transmitted by a cell. In this scenario, considering SSB 2 and SS/CORESET 0 Instance #2, a CORESET 0 TCI configuration where TCI 1: CSI-RS 1 QCLed with SSB 2 and TCI 2: CSI-RS 2 QCLed with SSB 2 may be used, such that 2 repetitions of SS/CORESET 0 Instance #2 are provided using the configured TCI 1 and TCI 2.

As another approach to handling SS/CORESET 0 in a SFN scheme, the SS/CORESET 0 instance monitored by a UE may be determined as one of the two TCI states configured for the SS/CORESET 0. It may be the case that the monitored occasion is based on the SSB QCLed with the downlink reference signal in the TCI state, according to any of various possible schemes for relating the downlink reference signal in the TCI state to the monitored occasion. As one such possible scheme, the TCI state with the lowest or highest TCI ID may be selected to monitor. As another possibility, the TCI state to provide a particular QCL information (e.g., QCL-TypeA, or another QCL-Type, as desired) may be selected. As a still further possibility, which TCI state is to be selected can be configured by higher layer signaling (e.g., via RRC or MAC CE signaling). For example, again considering the illustrated scenario of FIG. 8, if a CORESET 0 TCI configuration in which TCI 1: CSI-RS 1 QCLed with SSB 1 and TCI 2: CSI-RS 2 QCLed with SSB 2 is provided, if TCI 2 is selected for SS/CORESET 0 instance selection (e.g., based on configured the SS/CORESET 0 monitoring instance selection scheme), SS/CORESET 0 instance #2 may be monitored by the UE.

In some instances, it may be possible that a PDCCH repetition scheme is not applied to SS/CORESET 0 transmissions for SFN configurations. For example, it may be the case that it is not allowed to configure 2 TCI states for CORESET 0 for a SFN scheme. Alternatively, support for multiple TCI states for SS/CORESET 0 instances in a SFN configuration may be applicable for certain search space types (e.g., UE specific search space, as one possibility) but not others (e.g., type 0 common SS, as one possibility).

As a further possibility, it may be possible that another SS/CORESET with index other than 0 can be configured to be associated with SS/CORESET 0 for a SFN scheme. In such a scenario, it may be the case that the PDCCH in both SSs/CORESETs are fully overlapped in time/frequency. Different TCI states can be provided for the two CORESETs. The monitoring occasion for the PDCCH for a UE may be determined by the CORESET—or the second (associated) SS/CORESET, according to various embodiments.

It may also be useful to provide techniques for applying PDCCH reliability enhancements to SS/CORESET 0 transmissions in a non-SFN scheme, at least according to some embodiments. As one possible approach, a gNB may be able to indicate 2 TCI states for CORESET 0. Different TCI states can be QCLed with different SSBs. It may be the case that a UE monitors the PDCCH in SS/CORESET 0 instances associated with SSBs from the 2 TCI states. The UE may be able to assume the PDCCHs are transmitted as repetitions in the two instances within a configured or specified time window (e.g., within the configured SSB periodicity, as one possibility).

Figure 9:
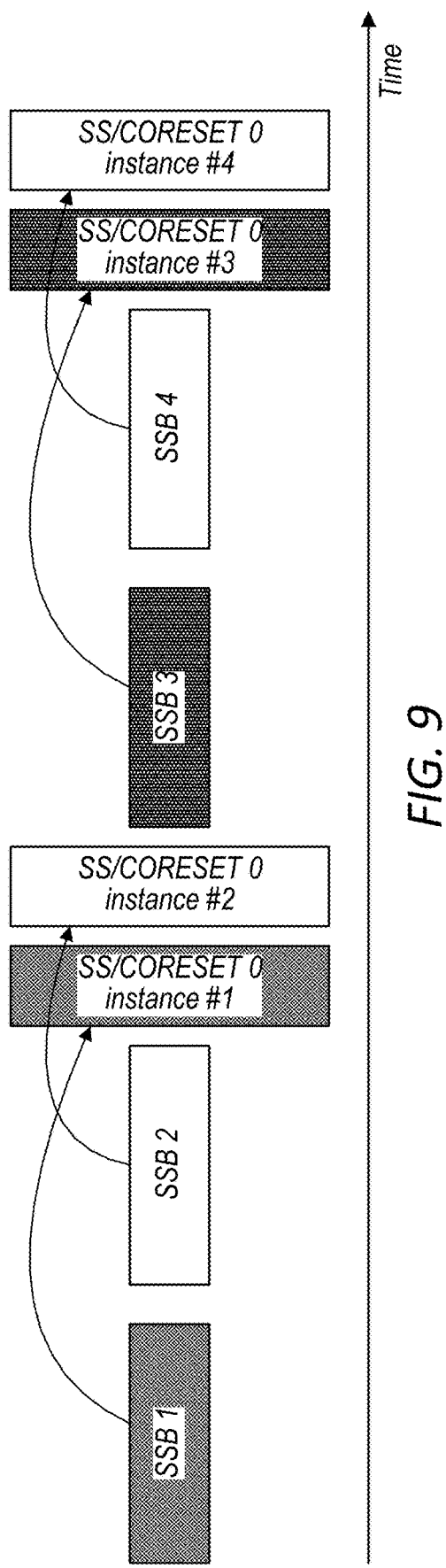

FIG. 9 illustrates exemplary aspects of such an approach, according to some embodiments. In the illustrated example, CORESET 0 TCI configuration may include TCI 1: CSI-RS QCLed with SSB 1 and TCI 2: CSI-RS2 QCLed with SSB 3. Accordingly, the PDCCH may be transmitted repeatedly in the illustrated SS/CORESET 0 instances 1 and 3 in this example scenario.

As another option, it may be possible for a gNB to configure another SS/CORESET with index x, where x is not equal to 0, and may configure an association between the SS/CORESET and SS/CORESET 0. In such a scenario, it may be the case that the PDCCH is transmitted repeatedly in the associated SS/CORESET and SS/CORESET 0 instance, as long as the associated SS/CORESET and SS/CORESET 0 instance occur within a configured time window (e.g., within a slot, or any other configured window). There may be several possibilities for handling scenarios in which the associated SS/CORESET and SS/CORESET 0 instance are not within the configured time window. As one such possibility, a UE may assume the PDCCH repetitions are transmitted in the SS/CORESET x and a closest SS/CORESET 0 instance within the time window. As another possibility, if such a scenario occurs, the UE may not need to (e.g., may not be expected to, according to 3GPP specifications) monitor the SS/CORESET x or the SS/CORESET 0 instance within the time window. As yet another possibility, the UE may need to (e.g., may be expected to, according to 3GPP specifications) monitor the SS/CORESET x and the SS/CORESET 0 instance, but may not assume that PDCCH transmissions carried by these SSs/CORESETs are repetitions. As a still further possibility, such a scenario may be considered an error case, e.g., that may generally be avoided by the serving cell and/or for which UE behavior may be left undefined.

Figure 10:
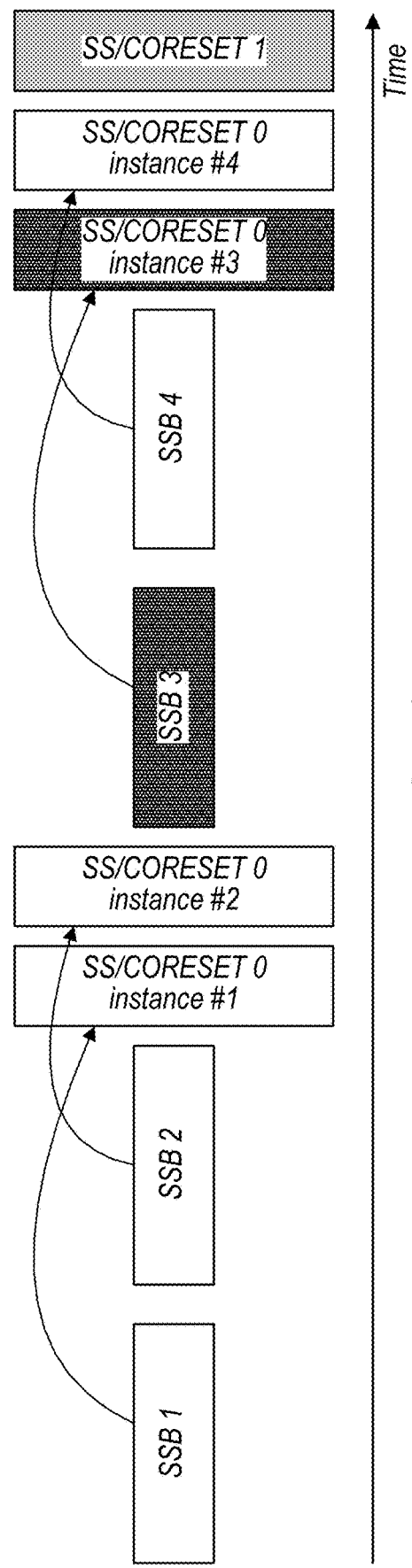

FIG. 10 illustrates exemplary aspects of such an approach, according to some embodiments. In the illustrated example, SS/CORESET 0 and SS/CORESET 1 may be associated. The TCI for CORESET 0 may be configured as TCI 3 QCLed with SSB 3. In such a scenario, a UE may assume the PDCCH transmissions included in SS/CORESET 0 instance 3 and SS/CORESET 1 are repetitions.

In some instances, it may also be possible that a PDCCH repetition scheme is not applied to SS/CORESET 0 transmissions for non-SFN configurations. For example, it may be the case that it is not allowed to configure 2 TCI states for CORESET 0 or to configure association between CORESET 0 and another CORESET for a non-SFN scheme. Alternatively, support for multiple TCI states for SS/CORESET 0 in a non-SFN configuration may be applicable for certain search space types (e.g., UE specific search space, as one possibility) but not others (e.g., type 0 common SS, as one possibility).

Another aspect of 3GPP Releases 15 and 16 is support for beam failure recovery (BFR) operation, for example as described further in 3GPP TS 38.213 section 6. The beam failure recovery operation may include a UE sending a beam failure recovery request (BFRQ) to a serving gNB after it detects that beam failure has occurred. The BFRQ may be provided to the gNB in one of a variety of possible ways.

For BFR on a primary cell (e.g., a PCell for a master cell group (MCG) or a PSCell for a secondary cell group (SCG)), a BFRQ may be carried by a contention-free (CF) physical random access channel (PRACH) procedure or a contention-based (CB) PRACH procedure. For the CF-PRACH procedure, the gNB may follow up on the BFRQ with a PDCCH transmission in a dedicated SS set (e.g., a SS-BFR), which may be configured using RRC signaling. The dedicated SS may be 1-to-1 associated with a CORESET. The UE may start to monitor the dedicated SS based on the beam associated with the CF-PRACH 4 slots after the PRACH transmission. The PDCCH transmission may function as a BFR response. FIG. 11 illustrates exemplary aspects of one such possible CF-PRACH based BFR operation on a PCell or PSCell, according to some embodiments.

For BFR on a secondary cell (e.g., a SCell in a MCG or SCG), it may be possible for the BFRQ to be carried by MAC CE, for example by way of a PCell or PSCell. In such a scenario, the BFR response may include a PDCCH transmission that schedules a new transmission with the same hybrid automatic repeat request (HARD) process as the PUSCH used for MAC CE transmission. FIG. 12 illustrates exemplary aspects of one such possible MAC-CE based BFR operation on a SCell, according to some embodiments.

For a CB-PRACH procedure on a PCell or PSCell, the gNB may send a PDCCH transmission to schedule a message 2 and message 4 as the BFR response in a SS configured for random access (e.g., ra-searchSpace) or in SS #0. FIG. 13 illustrates exemplary aspects of one such possible CB-PRACH based BFR operation on a PCell or PSCell, according to some embodiments.

As illustrated in FIGS. 11-13, for any of PCell/PSCell/SCell, it may be the case that the UE can apply the newly identified beam for PDCCH reception and PUCCH transmission 28 symbols after the UE receives the BFR response. Note that the UE may also reset one or more power control parameters for PUCCH transmissions in conjunction with such BFR operation, at least in some instances.

As previously noted herein, for 3GPP Release 17, PDCCH reliability enhancements including the use of PDCCH repetitions, possibly with different beam configurations, may be supported. Techniques for enhancing the reliability for beam failure recovery, for example by supporting UE identification of more than 1 new beam in a BFRQ and/or a BFR response scheme that can include the use of repetitions with different beam configurations, may similarly be useful, at least according to some embodiments.

One possible approach to providing support for such BFR reliability enhancements may include a UE reporting 1 beam in a BFRQ, and the BFR response being carried by more than 1 beam, for example using a SFN or non-SFN based scheme for PDCCH repetition. As another possibility, the UE may report more than one beam (N, where N>1) in a BFRQ, and the BFR response may also be carried by more than 1 beam, similarly potentially using a SFN or non-SFN based scheme for PDCCH repetition. In either case, the reported beam may be applied by the UE for PDCCH/PUCCH operation based on a configured or otherwise specified timeline.

For BFR on a PCell or PSCell, a gNB may be able to configure a UE to send more than 1 CF-PRACH and/or CB-PRACH resources for a BFRQ report. For example, one or more RRC parameters could be introduced to indicate such configuration. A UE may report whether it supports more than 1 CF-PRACH/CB-PRACH based BFRQ based on UE capability. It may be possible that the same threshold is configured for the UE to select additional beams for BFR, or that different thresholds are used for the first selected beam and for any possible additional beams. In some instances, it may be the case that a UE reports fewer beams than are supported, for example if the UE cannot identify enough beams that meet any required thresholds (e.g., for signal strength, signal quality, etc.).

For CB-PRACH based operation, it may be possible that a gNB can schedule more than 1 PUSCH repetition for message 3 transmission in the random access response (RAR) provided as the message 2 in the RACH procedure used for the BFR. For example, the RAR may indicate the number of repetitions for the message 3. The repetitions can be carried based on the beams associated with the CF-PRACH/CB-PRACH resources. The beam and repetition mapping can be predefined or configured by the RAR, among various possibilities.

As another possibility, the message 3 may be transmitted based on single repetition operation. In such a scenario, if the UE has indicated multiple beams in the BFRQ, the UE may apply one of those beams associated with the CF-PRACH/CB-PRACH for the message 3 transmission. The beam may be selected based on the lowest or highest PRACH resource index, the lowest or highest SSB/CSI-RS resource index associated with the PRACH resources, the first or last PRACH occasion, based on an indication in the RAR, and/or based on any of various other possible considerations.

Figure 14:
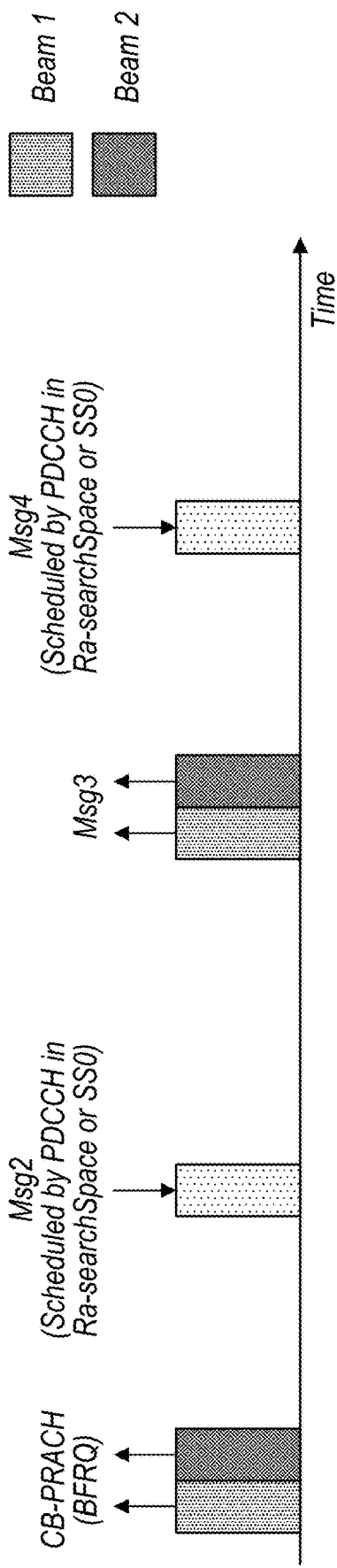
FIGS. 14-19 illustrate exemplary aspects of various possible approaches to performing beam failure recovery including identifying multiple new beams in a wireless communication system, according to some embodiments.
Figure 15:
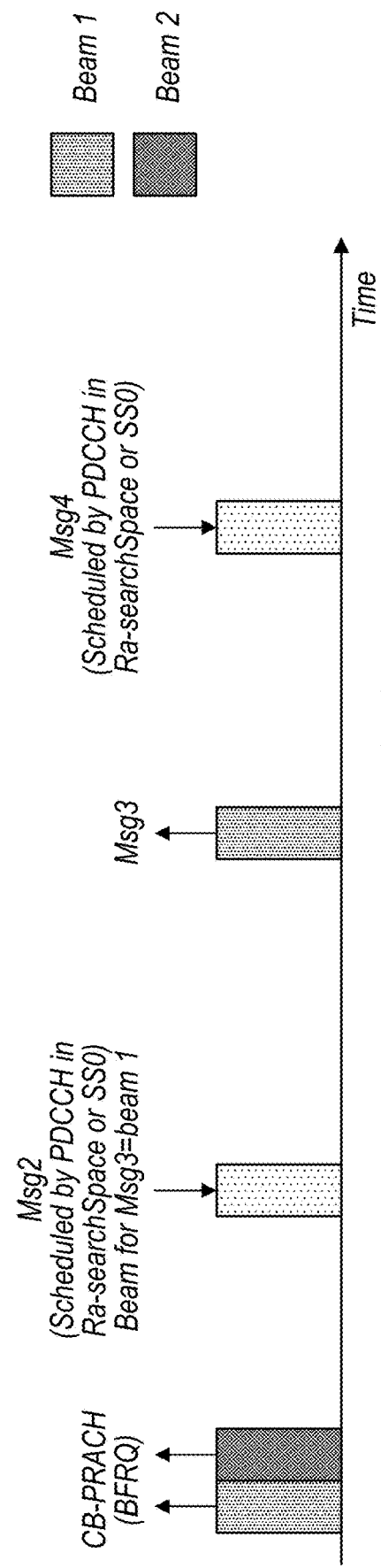

FIGS. 14-15 illustrate aspects of such possible operation, according to various embodiments. In particular, FIG. 14 illustrates aspects of a scenario in which multiple beams are used by a UE for both CB-PRACH transmission of the BFRQ and for message 3 transmission. FIG. 15 illustrates aspects of a scenario in which multiple beams are used by a UE for CB-PRACH transmission of the BFRQ and only one beam is used for message 3 transmission.

For BFR on a SCell, a gNB may be able to configure a UE to send more than 1 beam in a MAC CE. For example, one or more RRC parameters could be introduced to indicate such configuration. A UE may indicate whether it supports reporting more than 1 new beam in a MAC CE for BFR based on UE capability. It may be possible that the same threshold is configured for the UE to select additional beams for BFR, or that different thresholds are used for the first selected beam and for any possible additional beams. In some instances, it may be the case that a UE reports fewer beams than are supported, for example if the UE cannot identify enough beams that meet any required thresholds (e.g., for signal strength, signal quality, etc.). Thus, in such a scenario, when a gNB configures a UE to report N beams, the UE may report the number of identified beams as well as the beam index(es) in the MAC CE configured for such reporting.

For CF-PRACH based PCell/PSCell BFR, a gNB may be able to configure a UE to receive the BFR response in any of multiple possible ways. As one possibility, the BFR response can be carried by PDCCH in SS-BFR associated with a CORESET, which is based on more than 1 beam. The beams may be selected/configured based on the beams identified by CF-PRACH resources, e.g., in the BFRQ provided by the UE. Alternatively (e.g., if only 1 beam is identified by the CF-PRACH based BFRQ), the beams may be selected configured based on the beam identified by the CF-PRACH resource on which the BFRQ is provided and one or more other beams configured by higher layer signaling, such as RRC or MAC CE based signaling. As another possibility, the beams may be selected configured based on the beam identified by the CF-PRACH resource on which the BFRQ is provided and one or more other beams configured for one or more active TCI states, such as one or more TCI states configured for PDSCH reception. Whether the beams are mapped based on a SFN scheme or a non-SFN scheme for PDCCH repetition can be configured by higher layer signaling. For a non-SFN scheme, the beams may be mapped to different instances of SS-BFR (TDM manner) and/or different resource elements for a PDCCH (FDM manner). Alternatively, it may be possible that such an approach can be used in conjunction with a SFN scheme and not with a non-SFN scheme.

Figure 16:
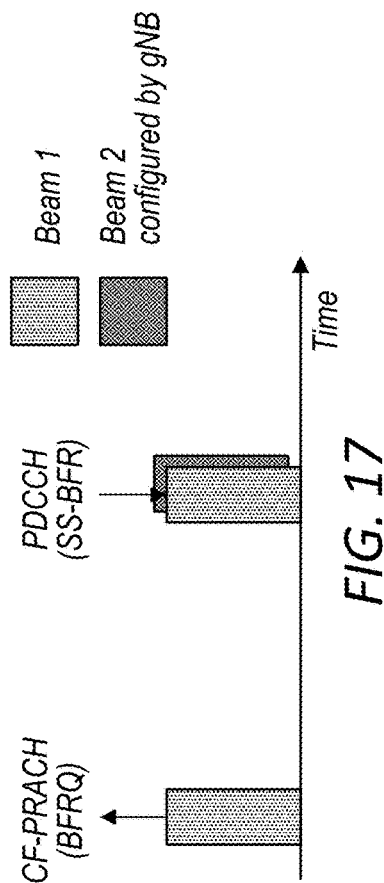
Figure 17:
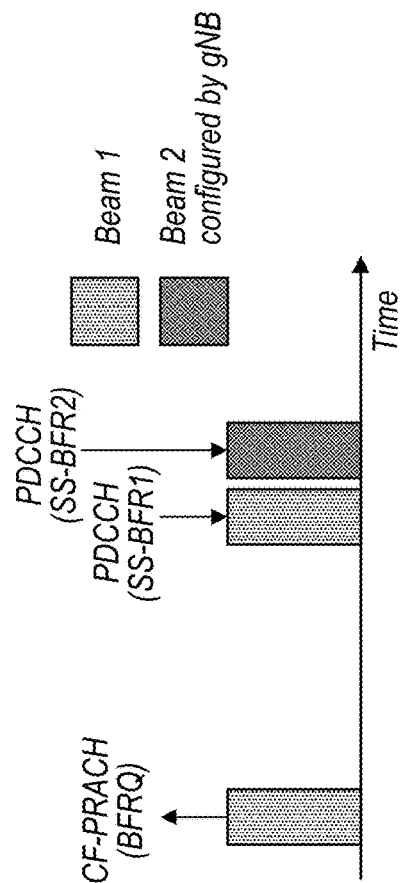

FIGS. 16-17 illustrate aspects of such possible operation, according to various embodiments. In particular, FIG. 16 illustrates aspects of a scenario in which multiple beams in the same SS are used to provide the BFR response to a CF-PRACH based BFRQ, where the beams selected are the beams identified by the UE in the CF-PRACH transmission of the BFRQ. FIG. 15 illustrates aspects of a scenario in which multiple beams in the same SS are used to provide the BFR response to a CF-PRACH based BFRQ, where the beams selected include one beam identified by the UE in the CF-PRACH transmission of the BFRQ and one beam configured by the gNB.

In some embodiments, the BFR response can be carried by PDCCH in more than 1 SS-BFR, and each can be associated with the same or different CORESETs. In some such instances, the beam for each CORESET may be based on the beams identified by CF-PRACH resources. The mapping between CORESET and the new beam can be determined based on the RACH occasion and the CORESET ID, as one possibility. For example, the beam with lowest RACH occasion can be mapped to the CORESET with lowest ID, as one possibility. Other approaches to such mapping are also possible. In other instances (e.g., if only 1 beam is identified by the CF-PRACH based BFRQ), the beam for one CORESET may be based on one beam identified by CF-PRACH and the beam for the other CORESET may be configured by higher layer signaling. The CORESET can be selected based on CORESET ID, e.g., lowest ID, or SS ID, e.g., lowest SS ID, among various possibilities. Note that it may be the case that such an approach can only be used for a non-SFN based PDCCH repetition scheme, according to some embodiments.

In some instances, since a non-SFN based PDCCH repetition scheme may use more CORESETs for PDCCH transmission, it may be possible that a gNB can configure a SS other than a SS-BFR to be associated with the same CORESET that a SS-BFR is associated with.

At least according to some embodiments, a UE may be configured to monitor the configured CORESET(s) 4 slots after the UE sends a CF-PRACH for BFR based on a newly identified beam or multiple newly identified beams.

Figure 18:
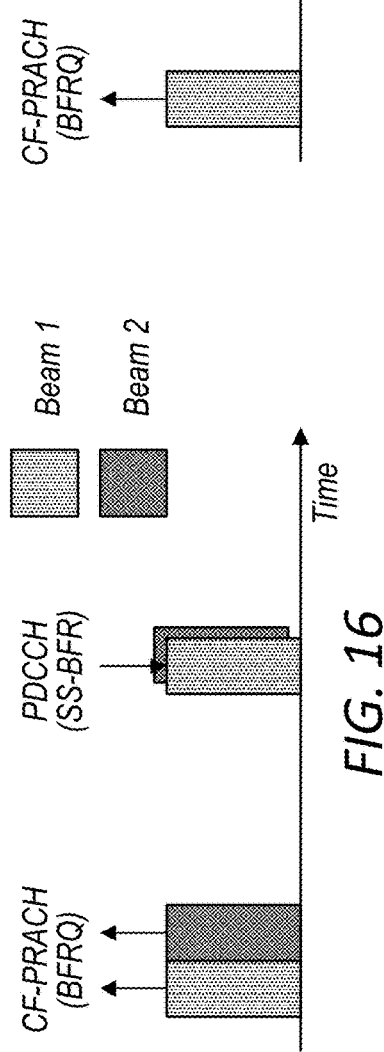
Figure 19:
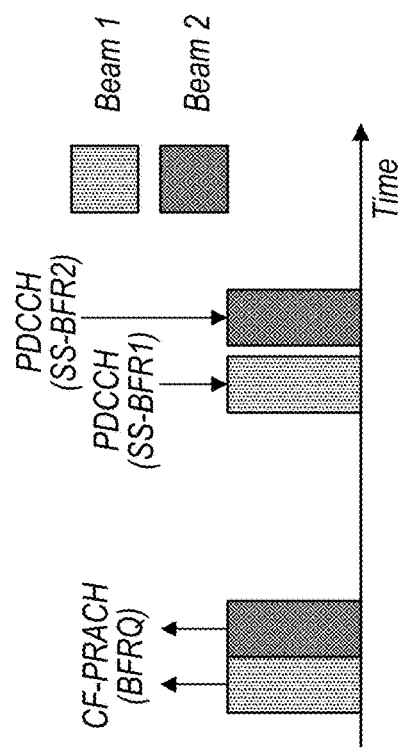

FIGS. 18-19 illustrate aspects of such a possible non-SFN based approach to providing multiple PDCCH repetitions for a BFR response in a CF-PRACH based approach to BFR, according to various embodiments. In particular, FIG. 18 illustrates aspects of a scenario in which multiple beams in multiple SSs are used to provide the BFR response to a CF-PRACH based BFRQ, where the beams selected are the beams identified by the UE in the CF-PRACH transmission of the BFRQ. FIG. 19 illustrates aspects of a scenario in which multiple beams in multiple SSs are used to provide the BFR response to a CF-PRACH based BFRQ, where the beams selected include one beam identified by the UE in the CF-PRACH transmission of the BFRQ and one beam configured by the gNB.

Similar approaches as described herein with respect to CF-PRACH based approaches to BFR may also be used for CB-PRACH based approaches to BFR, at least according to some embodiments. For example, similar to providing more than 1 beam in a BFR response to a CF-PRACH based BFRQ, more than 1 beam can be applied to the CORESET associated with the ra-searchSpace used to carry the message 2 in a CB-PRACH based approach to BFR, in some instances. As another example, a gNB may be able to configure more than 1 ra-searchSpace or to configure a SS in addition to the ra-searchSpace/SS0 for message 2 and message 4 scheduling. For SCell BFR, the BFR response can be transmitted based on SFN or non-SFN based PDCCH repetition schemes. When a non-SFN scheme is applied, it may be the case that the configured amount of time to apply the newly identified beam(s) (e.g., 28 symbols, as one possibility) is counted based on a configured or specified one of the linked SS or PDCCH repetitions. For example, it may be configured or specified that the configured amount of time to apply the newly identified beam(s) begins with the first or last SS or PDCCH candidate. As another possibility, the SS with the lowest or highest SS-ID or CORESET ID may be used as a basis for determining when the configured delay to apply the newly identified beam(s) begins.

When a UE identifies more than 1 beam in a BFRQ, after the specified or configured amount of time to apply the newly identified beam(s) has passed, the UE may apply one of the beams for PDCCH/PUCCH operation. The beam may be selected based on the lowest or highest PRACH resource index, the lowest or highest SSB/CSI-RS resource index associated with the PRACH resources, the first or last PRACH occasion, and/or based on any of various other possible considerations. Alternatively, the beam index to be used can be indicated by the gNB, for example by DCI in the BFR response.

As another possibility, after the specified or configured amount of time to apply the newly identified beam(s) has passed, the UE may apply each of the beams for PDCCH and for different PUCCH resources. For example, for a SFN based PDCCH repetition scheme, the UE may apply all of the beams for PDCCH repetition. For a non-SFN based PDCCH repetition scheme, the UE may apply different beams to different CORESETs. In such a scenario, the mapping between beam and CORESET may be determined by CORESET index or CORESET pool index and beam index, e.g., SSB/CSI-RS index. Alternatively, the mapping between beam and CORESET can be configured by higher layer signaling or DCI. For PUCCH, the UE may apply different beams to different PUCCH resources or resource groups. The mapping between beam and PUCCH resource can be determined by PUCCH resource index or PUCCH resource group index and beam index, e.g., SSB/CSI-RS index. Alternatively, the mapping between beam and PUCCH resource can be configured by higher layer signaling or DCI.

In the following further exemplary embodiments are provided.

One set of embodiments may include an apparatus, comprising: a processor configured to cause a wireless device to: establish a wireless link with a cellular base station; determine a search space (SS) and control resource set (CORESET) index 0 configuration for the wireless link with the cellular base station, wherein the SS and CORESET index 0 configuration supports physical downlink control channel (PDCCH) repetitions; and monitor the SS and CORESET index 0 in accordance with the SS and CORESET index 0 configuration.

According to some embodiments, the wireless link operates according to a single frequency network (SFN) scheme, wherein according to the SS and CORESET index 0 configuration, multiple transmission configuration indicator (TCI) states are quasi-co-located (QCLed) with a synchronization signal block (SSB), and multiple repetitions of a SS and CORESET index 0 instance associated with the SSB are provided using the multiple TCI states QCLed with the SSB.

According to some embodiments, the wireless link operates according to a single frequency network (SFN) scheme, wherein the processor is further configured to cause the wireless device to: determine multiple SS and CORESET index 0 transmission configuration indicator (TCI) states configured for PDCCH repetitions for the wireless device, wherein according to the SS and CORESET index 0 configuration, each of the SS and CORESET index 0 TCI states is quasi-co-located (QCLed) with a synchronization signal block (SSB); and determine a SS and CORESET index 0 instance to monitor based at least in part on a TCI state associated with the SS and CORESET index 0 instance.

According to some embodiments, the wireless link operates according to a single frequency network (SFN) scheme, wherein the SS and CORESET index 0 configuration supports PDCCH repetitions for one or more types of SSs, wherein the SS and CORESET index 0 configuration does not support PDCCH repetitions for one or more other types of SSs.

According to some embodiments, the wireless link operates according to a single frequency network (SFN) scheme, wherein according to the SS and CORESET index 0 configuration, a SS and CORESET instance with an index other than 0 is associated with a SS and CORESET index 0 instance, wherein the SS and CORESET instance with the index other than 0 and the associated SS and CORESET index 0 instance have different transmission configuration indicator (TCI) states, wherein the SS and CORESET instance with the index other than 0 and the associated SS and CORESET index 0 instance are fully overlapping in time and frequency resources.

According to some embodiments, the wireless link operates according to a non single frequency network (SFN) scheme, wherein according to the SS and CORESET index 0 configuration, multiple transmission configuration indicator (TCI) states are configured for SS and CORESET index 0 for the wireless link, wherein different TCI states are quasi-co-located (QCLed) with different synchronization signal blocks (SSBs), wherein the processor is further configured to cause the wireless device to: determine to monitor multiple SS and CORESET index 0 instances, wherein the multiple SS and CORESET index 0 instances monitored are determined based at least in part on the SSBs with which the TCI states configured for the SS and CORESET index 0 for the wireless device are QCLed.

According to some embodiments, the wireless link operates according to a non single frequency network (SFN) scheme, wherein according to the SS and CORESET index 0 configuration, a SS and CORESET instance with an index other than 0 is associated with a SS and CORESET index 0 instance, wherein the SS and CORESET index 0 configuration supports provision of PDCCH repetitions using the SS and CORESET instance with the index other than 0 and the associated SS and CORESET index 0 instance.

According to some embodiments, the wireless link operates according to a non single frequency network (SFN) scheme, wherein the SS and CORESET index 0 configuration supports PDCCH repetitions for one or more types of SSs, wherein the SS and CORESET index 0 configuration does not support PDCCH repetitions for one or more other types of SSs.

Another set of embodiment may include a method, comprising: by a cellular base station: establishing a wireless link with a wireless device; determining a search space (SS) and control resource set (CORESET) index 0 configuration for the wireless link with the wireless device, wherein the SS and CORESET index 0 configuration supports physical downlink control channel (PDCCH) repetitions; and providing multiple PDCCH repetitions to the wireless device in accordance with the SS and CORESET index 0 configuration.

According to some embodiments, the wireless link operates according to a single frequency network (SFN) scheme, wherein according to the SS and CORESET index 0 configuration, multiple transmission configuration indicator (TCI) states are quasi-co-located (QCLed) with a synchronization signal block (SSB), and multiple repetitions of a SS and CORESET index 0 instance associated with the SSB are provided using the multiple TCI states QCLed with the SSB.

According to some embodiments, the wireless link operates according to a single frequency network (SFN) scheme, wherein the processor is further configured to cause the wireless device to: configure multiple SS and CORESET index 0 transmission configuration indicator (TCI) states for PDCCH repetitions for the wireless device, wherein according to the SS and CORESET index 0 configuration, each of the SS and CORESET index 0 TCI states is quasi-co-located (QCLed) with a synchronization signal block (SSB).

According to some embodiments, the wireless link operates according to a single frequency network (SFN) scheme, wherein the SS and CORESET index 0 configuration supports PDCCH repetitions for one or more types of SSs, wherein the SS and CORESET index 0 configuration does not support PDCCH repetitions for one or more other types of SSs.

According to some embodiments, the wireless link operates according to a single frequency network (SFN) scheme, wherein according to the SS and CORESET index 0 configuration, a SS and CORESET instance with an index other than 0 is associated with a SS and CORESET index 0 instance, wherein the SS and CORESET instance with the index other than 0 and the associated SS and CORESET index 0 instance have different transmission configuration indicator (TCI) states, wherein the SS and CORESET instance with the index other than 0 and the associated SS and CORESET index 0 instance are fully overlapping in time and frequency resources.

According to some embodiments, the wireless link operates according to a non single frequency network (SFN) scheme, wherein according to the SS and CORESET index 0 configuration, multiple transmission configuration indicator (TCI) states are configured for SS and CORESET index 0 for the wireless link, wherein different TCI states are quasi-co-located (QCLed) with different synchronization signal blocks (SSBs), wherein the SS and CORESET index 0 configuration supports provision of PDCCH repetitions using SS and CORESET index 0 instances associated with SSBs QCLed with the TCI states configured for SS and CORESET index 0 for the wireless link.

According to some embodiments, the wireless link operates according to a non single frequency network (SFN) scheme, wherein according to the SS and CORESET index 0 configuration, a SS and CORESET instance with an index other than 0 is associated with a SS and CORESET index 0 instance, wherein the SS and CORESET index 0 configuration supports provision of PDCCH repetitions using the SS and CORESET instance with the index other than 0 and the associated SS and CORESET index 0 instance.

According to some embodiments, the wireless link operates according to a non single frequency network (SFN) scheme, wherein the SS and CORESET index 0 configuration supports PDCCH repetitions for one or more types of SSs, wherein the SS and CORESET index 0 configuration does not support PDCCH repetitions for one or more other types of SSs.

Yet another set of embodiments may include a wireless device, comprising: an antenna; a radio operably coupled to the antenna; and a processor operably coupled to the radio; wherein the wireless device is configured to: establish a wireless link with a cellular base station; determine that beam failure has occurred for the wireless link; perform beam failure recovery with the cellular base station, wherein multiple beams are identified as candidate beams for the beam failure recovery; and communicate with the cellular base station using one or more beams identified as candidate beams for the beam failure recovery.

According to some embodiments, the beam failure recovery is performed using a contention free (CF) random access channel (RACH) procedure, wherein the wireless device is further configured to: transmit a beam failure recovery request using multiple CF physical RACH (PRACH) resources, wherein a different beam is used to transmit on each CF PRACH resource of the multiple CF PRACH resources, wherein the beams used to transmit on the multiple CF PRACH resources are identified as candidate beams for beam failure recovery.

According to some embodiments, the beam failure recovery is performed using a contention based (CB) random access channel (RACH) procedure, wherein the wireless device is further configured to: transmit a beam failure recovery request to the cellular base station using multiple CB physical RACH (PRACH) resources, wherein a different beam is used to transmit on each CB PRACH resource of the multiple CB PRACH resources, wherein the beams used to transmit on the multiple CF PRACH resources are identified as candidate beams for beam failure recovery.

According to some embodiments, the wireless device is further configured to: receive a beam failure recovery response from the cellular base station, wherein the beam failure recovery response indicates a number of repetitions to transmit in a message 3 of the CB RACH procedure; and transmit the message 3 of the CB RACH procedure using the indicated number of repetitions, wherein if multiple repetitions are indicated, the beams used to transmit the beam failure recovery request on the multiple CB PRACH resources are also used to transmit the message 3 of the CB RACH procedure.

According to some embodiments, the wireless device is further configured to: receive a beam failure recovery response from the cellular base station as a random access response (RAR) message of the CB RACH procedure in response to the beam failure recovery request; select a beam to use to transmit a message 3 of the CB RACH procedure, wherein the beam is selected from the beams used to transmit the beam failure recovery request on the multiple CB PRACH resources; and transmit the message 3 of the CB RACH procedure to the cellular base station using the selected beam.

According to some embodiments, the beam failure recovery is performed via media access control (MAC) control element (CE) signaling, wherein the wireless device is further configured to: provide a beam failure recovery request that identifies multiple candidate beams for beam failure recovery to the cellular base station via MAC CE signaling.

According to some embodiments, the wireless device is further configured to: provide wireless device capability information indicating whether the wireless device supports beam failure recovery request transmission using multiple contention free (CF) physical random access channel (PRACH) resources or multiple contention based (CB) PRACH resources.

According to some embodiments, the wireless device is further configured to: transmit a beam failure recovery request to the cellular base station; and receive a beam failure recovery response from the cellular base station, wherein the beam failure recovery response is received using multiple beams.

According to some embodiments, the beam failure recovery request is transmitted using multiple beams, wherein the multiple beams used to receive the beam failure recovery response are based on the multiple beams used to transmit the beam failure recovery request.

According to some embodiments, the beam failure recovery request is transmitted using a first beam, wherein the multiple beams used to transmit the beam failure recovery response include at least the first beam and a second beam, wherein the second beam is configured by radio resource control (RRC) signaling or media access control (MAC) control element (CE) signaling or is selected based on an active transmission configuration indication (TCI) state for the wireless device.

According to some embodiments, the beam failure recovery response is received via a physical downlink control channel (PDCCH) provided in a search space for beam failure recovery (SS-BFR) associated with a control resource set (CORESET) that supports use of multiple beams.

According to some embodiments, the beam failure recovery response is received via physical downlink control channel (PDCCH) transmissions provided in multiple search space (SS) and control resource set (CORESET) combinations.

According to some embodiments, the wireless device is configured to wait a configured amount of time after the beam failure recovery response is received to communicate with the cellular base station using the one or more beams identified as candidate beams for the beam failure recovery, wherein the wireless device is further configured to: determine a SS and CORESET combination of the multiple SS and CORESET combinations from which to apply the configured amount of time to wait to communicate with the cellular base station using the one or more beams identified as candidate beams for the beam failure recovery.

According to some embodiments, the wireless device is further configured to: communicate with the cellular base station using multiple beams identified as candidate beams for the beam failure recovery.

Still another set of embodiments may include a method, comprising: by a cellular base station: establishing a wireless link with a wireless device; determining that beam failure has occurred for the wireless link; performing beam failure recovery with the wireless device, wherein multiple beams are identified as candidate beams for the beam failure recovery; and communicating with the wireless device using one or more beams identified as candidate beams for the beam failure recovery.

According to some embodiments, the beam failure recovery is performed using a contention free (CF) random access channel (RACH) procedure, wherein the method further comprises: receiving a beam failure recovery request from the wireless device using multiple CF physical RACH (PRACH) resources, wherein a different beam is used to receive on each CF PRACH resource of the multiple CF PRACH resources, wherein the beams used to receive on the multiple CF PRACH resources are identified as candidate beams for beam failure recovery.

According to some embodiments, the beam failure recovery is performed using a contention based (CB) random access channel (RACH) procedure, wherein the method further comprises: receiving a beam failure recovery request from the wireless device using multiple CB physical RACH (PRACH) resources, wherein a different beam is used to receive on each CB PRACH resource of the multiple CB PRACH resources, wherein the beams used to receive on the multiple CB PRACH resources are identified as candidate beams for beam failure recovery.

According to some embodiments, the method further comprises: transmitting a beam failure recovery response to the wireless device, wherein the beam failure recovery response indicates a number of repetitions to transmit in a message 3 of the CB RACH procedure; and receiving the message 3 of the CB RACH procedure using the indicated number of repetitions, wherein if multiple repetitions are indicated, the beams used to receive the beam failure recovery request on the multiple CB PRACH resources are also used to receive the message 3 of the CB RACH procedure.

According to some embodiments, the method further comprises: transmitting a beam failure recovery response to the wireless device as a random access response (RAR) message of the CB RACH procedure in response to the beam failure recovery request; determining a beam to use to receive a message 3 of the CB RACH procedure, wherein the beam is selected from the beams used for receiving the beam failure recovery request on the multiple CB PRACH resources; and receiving the message 3 of the CB RACH procedure from the wireless device using the determined beam.

According to some embodiments, the beam failure recovery is performed via media access control (MAC) control element (CE) signaling, wherein the method further comprises: receiving a beam failure recovery request that identifies multiple candidate beams for beam failure recovery from the wireless device via MAC CE signaling.

According to some embodiments, the method further comprises: receiving wireless device capability information indicating whether the wireless device supports beam failure recovery request transmission using multiple contention free (CF) physical random access channel (PRACH) resources or multiple contention based (CB) PRACH resources.

According to some embodiments, the method further comprises: receiving a beam failure recovery request from the wireless device; and transmitting a beam failure recovery response to the wireless device, wherein the beam failure recovery response is transmitted using multiple beams.

According to some embodiments, the beam failure recovery request is received using multiple beams, wherein the multiple beams used to transmit the beam failure recovery response are based on the multiple beams used to receive the beam failure recovery request.

According to some embodiments, the beam failure recovery request is received using a first beam, wherein the multiple beams used to transmit the beam failure recovery response include at least the first beam and a second beam, wherein the second beam is configured by radio resource control (RRC) signaling or media access control (MAC) control element (CE) signaling or is selected based on an active transmission configuration indication (TCI) state for the wireless device.

According to some embodiments, the beam failure recovery response is transmitted via a physical downlink control channel (PDCCH) provided in a search space for beam failure recovery (SS-BFR) associated with a control resource set (CORESET) that supports use of multiple beams.

According to some embodiments, the beam failure recovery response is transmitted via physical downlink control channel (PDCCH) transmissions provided in multiple search space (SS) and control resource set (CORESET) combinations.

According to some embodiments, the cellular base station is configured to wait a configured amount of time after the beam failure recovery response is transmitted to communicate with the wireless device using the one or more beams identified as candidate beams for the beam failure recovery, wherein the cellular base station is further configured to: determine a SS and CORESET combination of the multiple SS and CORESET combinations from which to apply the configured amount of time to wait to communicate with the wireless device using the one or more beams identified as candidate beams for the beam failure recovery.

According to some embodiments, the method further comprises: communicating with the wireless device using multiple beams identified as candidate beams for the beam failure recovery.

A further exemplary embodiment may include a method, comprising: performing, by a device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
determine a search space (SS) and control resource set (CORESET) index 0 configuration for a wireless link with a cellular base station, wherein the SS and CORESET index 0 configuration supports single frequency network (SFN) physical downlink control channel (PDCCH) repetitions, wherein the SFN PDCCH repetitions have different active transmission configuration indicator (TCI) states and are to be received in the same SS; and
monitor the SS and CORESET index 0 instance in accordance with the SS and CORESET index 0 configuration and the different active TCI states, wherein monitoring according to the different active TCI states is not applicable to a type0 common SS.

2. The apparatus of claim 1,
wherein the wireless link operates according to a SFN scheme,
wherein according to the SS and CORESET index 0 configuration, multiple TCI states are quasi-co-located (QCLed) with a synchronization signal block (SSB), and multiple repetitions of a SS and CORESET index 0 instance associated with the SSB are provided using the multiple TCI states QCLed with the SSB.

3. The apparatus of claim 1,
wherein the wireless link operates according to a SFN scheme, wherein the processor is further configured to cause the wireless device to:
determine multiple SS and CORESET index 0 TCI states configured for PDCCH repetitions for the wireless device, wherein according to the SS and CORESET index 0 configuration, each of the SS and CORESET index 0 TCI states is quasi-co-located (QCLed) with a synchronization signal block (SSB); and
determine a SS and CORESET index 0 instance to monitor based at least in part on a TCI state associated with the SS and CORESET index 0 instance.

4. The apparatus of claim 1,
wherein the wireless link operates according to a SFN scheme,
wherein the SS and CORESET index 0 configuration supports PDCCH repetitions for one or more types of SSs, wherein the SS and CORESET index 0 configuration does not support PDCCH repetitions for one or more other types of SSs.

5. The apparatus of claim 1,
wherein the wireless link operates according to a SFN scheme,
wherein according to the SS and CORESET index 0 configuration, a SS and CORESET instance with an index other than 0 is associated with a SS and CORESET index 0 instance, wherein the SS and CORESET instance with the index other than 0 and the associated SS and CORESET index 0 instance have different TCI states,
wherein the SS and CORESET instance with the index other than 0 and the associated SS and CORESET index 0 instance are fully overlapping in time and frequency resources.

6. The apparatus of claim 1,
wherein the wireless link operates according to a non SFN scheme,
wherein according to the SS and CORESET index 0 configuration, multiple TCI states are configured for SS and CORESET index 0 for the wireless link, wherein different TCI states are quasi-co-located (QCLed) with different synchronization signal blocks (SSBs), wherein the processor is further configured to cause the wireless device to:
determine to monitor multiple SS and CORESET index 0 instances, wherein the multiple SS and CORESET index 0 instances monitored are determined based at least in part on the SSBs with which the TCI states configured for the SS and CORESET index 0 for the wireless device are QCLed.

7. The apparatus of claim 1,
wherein the wireless link operates according to a non SFN scheme,
wherein according to the SS and CORESET index 0 configuration, a SS and CORESET instance with an index other than 0 is associated with a SS and CORESET index 0 instance,
wherein the SS and CORESET index 0 configuration supports provision of PDCCH repetitions using the SS and CORESET instance with the index other than 0 and the associated SS and CORESET index 0 instance.

8. The apparatus of claim 1,
wherein the wireless link operates according to a non SFN scheme,
wherein the SS and CORESET index 0 configuration supports PDCCH repetitions for one or more types of SSs, wherein the SS and CORESET index 0 configuration does not support PDCCH repetitions for one or more other types of SSs.

9. A method, comprising:
by a cellular base station:
determining a search space (SS) and control resource set (CORESET) index 0 configuration for a wireless link with a wireless device, wherein the SS and CORESET index 0 configuration supports single frequency network (SFN) physical downlink control channel (PDCCH) repetitions, wherein the SFN PDCCH repetitions have different active transmission configuration indicator (TCI) states and are to be received in the same SS; and
providing multiple PDCCH repetitions to the wireless device in accordance with the SS and CORESET index 0 configuration and the different active TCI states, wherein providing according to the different active TCI states is not applicable to a type0 common SS.

10. The method of claim 9,
wherein the wireless link operates according to a SFN scheme,
wherein according to the SS and CORESET index 0 configuration, multiple TCI states are quasi-co-located (QCLed) with a synchronization signal block (SSB), and multiple repetitions of a SS and CORESET index 0 instance associated with the SSB are provided using the multiple TCI states QCLed with the SSB.

11. The method of claim 9,
wherein the wireless link operates according to a single frequency network (SFN) scheme, wherein the method further comprises:
configuring multiple SS and CORESET index 0 TCI states for PDCCH repetitions for the wireless device, wherein according to the SS and CORESET index 0 configuration, each of the SS and CORESET index 0 TCI states is quasi-co-located (QCLed) with a synchronization signal block (SSB).

12. The method of claim 9,
wherein the wireless link operates according to a SFN scheme,
wherein the SS and CORESET index 0 configuration supports PDCCH repetitions for one or more types of SSs, wherein the SS and CORESET index 0 configuration does not support PDCCH repetitions for one or more other types of SSs.

13. The method of claim 9,
wherein the wireless link operates according to a SFN scheme,
wherein according to the SS and CORESET index 0 configuration, a SS and CORESET instance with an index other than 0 is associated with a SS and CORESET index 0 instance, wherein the SS and CORESET instance with the index other than 0 and the associated SS and CORESET index 0 instance have different TCI states,
wherein the SS and CORESET instance with the index other than 0 and the associated SS and CORESET index 0 instance are fully overlapping in time and frequency resources.

14. The method of claim 9,
wherein the wireless link operates according to a non SFN scheme,
wherein according to the SS and CORESET index 0 configuration, multiple TCI states are configured for SS and CORESET index 0 for the wireless link, wherein different TCI states are quasi-co-located (QCLed) with different synchronization signal blocks (SSBs),
wherein the SS and CORESET index 0 configuration supports provision of PDCCH repetitions using SS and CORESET index 0 instances associated with SSBs QCLed with the TCI states configured for SS and CORESET index 0 for the wireless link.

15. The method of claim 9,
wherein the wireless link operates according to a non SFN scheme,
wherein according to the SS and CORESET index 0 configuration, a SS and CORESET instance with an index other than 0 is associated with a SS and CORESET index 0 instance,
wherein the SS and CORESET index 0 configuration supports provision of PDCCH repetitions using the SS and CORESET instance with the index other than 0 and the associated SS and CORESET index 0 instance.

16. The method of claim 9,
wherein the wireless link operates according to a non SFN scheme,
wherein the SS and CORESET index 0 configuration supports PDCCH repetitions for one or more types of SSs, wherein the SS and CORESET index 0 configuration does not support PDCCH repetitions for one or more other types of SSs.

17. A cellular base station, comprising:
an antenna;
a radio coupled to the antenna;
and a processor operably coupled to the radio,
wherein the cellular base station is configured to:
determine a search space (SS) and control resource set (CORESET) index 0 configuration for a wireless link with a wireless device, wherein the SS and CORESET index 0 configuration supports single frequency network (SFN) physical downlink control channel (PDCCH) repetitions wherein the SFN PDCCH repetitions have different active transmission configuration indicator (TCI) states and are to be received in the same SS; and
providing multiple PDCCH repetitions to the wireless device in accordance with the SS and CORESET index 0 configuration and the different active TCI states, wherein providing according to the different active TCI states is not applicable to a type° common SS.

18. The cellular base station of claim 17,
wherein the wireless link operates according to a SFN scheme.

19. The cellular base station of claim 17,
wherein the wireless link operates according to a non SFN scheme.

20. The cellular base station of claim 19, wherein the SS and CORESET index 0 configuration supports PDCCH repetitions for one or more types of SSs, wherein the SS and CORESET index 0 configuration does not support PDCCH repetitions for one or more other types of SSs.

* * * * *

UNITED STATES PATENT AND TRADEMARK OFFICE
CERTIFICATE OF CORRECTION

| | |
|---|---|
| PATENT NO. | : 12,016,060 B2 |
| APPLICATION NO. | : 17/438506 |
| DATED | : June 18, 2024 |
| INVENTOR(S) | : Yushu Zhang et al. |

It is certified that error appears in the above-identified patent and that said Letters Patent is hereby corrected as shown below:

In the Claims

Column 36, Line 54, delete "typeO" and substitute --type0--.

Signed and Sealed this
Third Day of September, 2024

Katherine Kelly Vidal
*Director of the United States Patent and Trademark Office*